July 1, 1941.　　　G. J. SCHMIDT　　　2,247,787
SUCTION LIFTER
Filed July 29, 1939　　　6 Sheets-Sheet 3
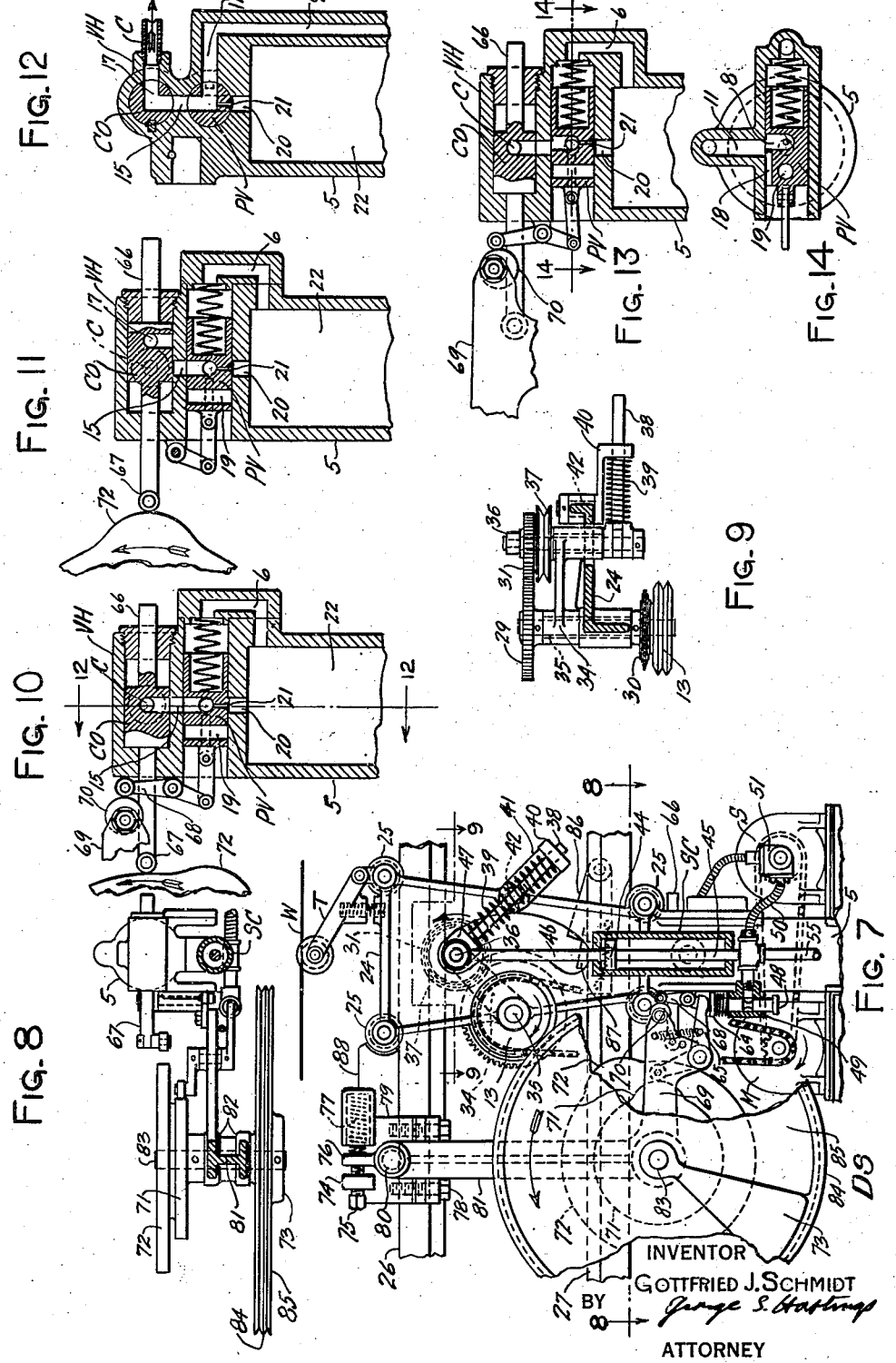

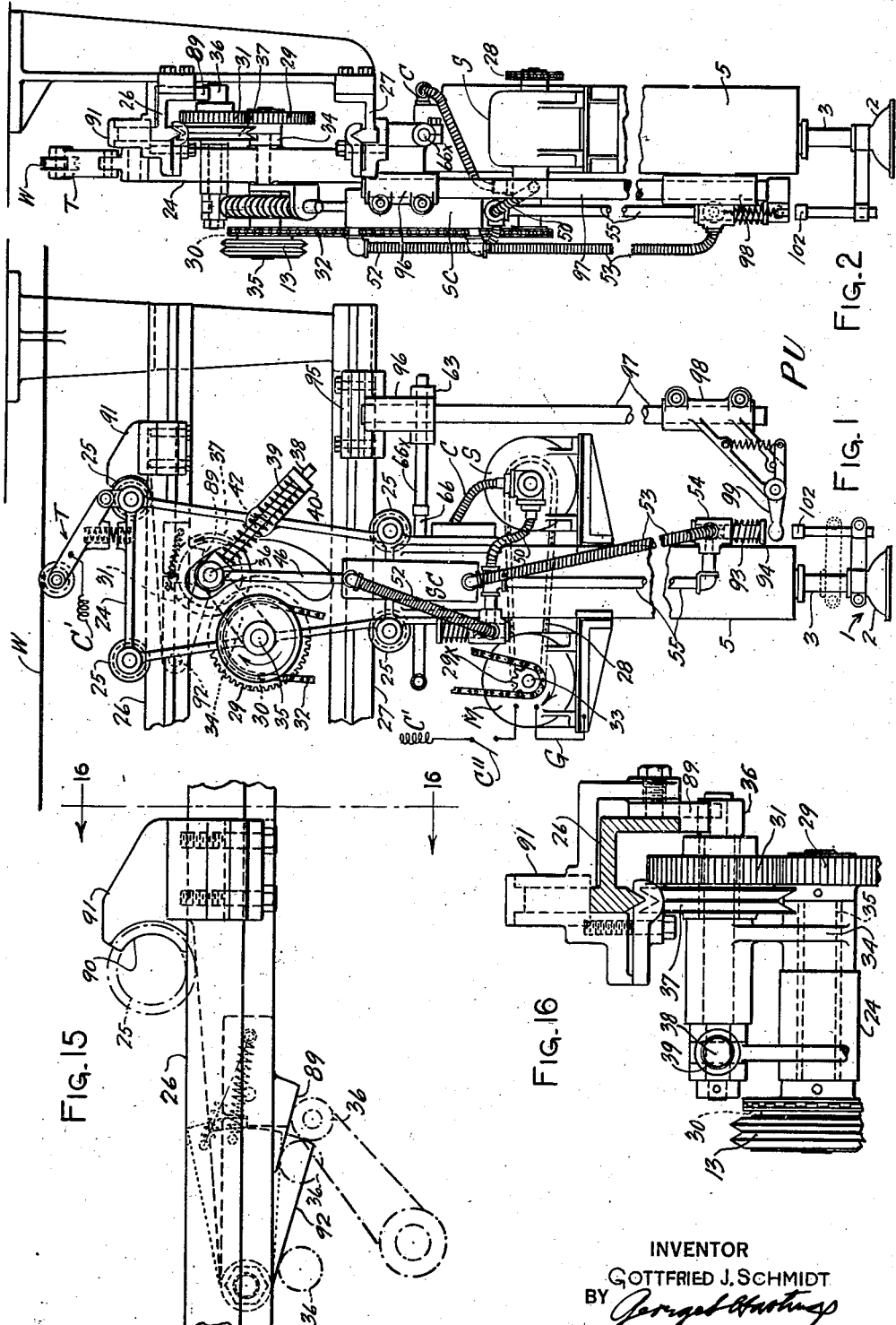

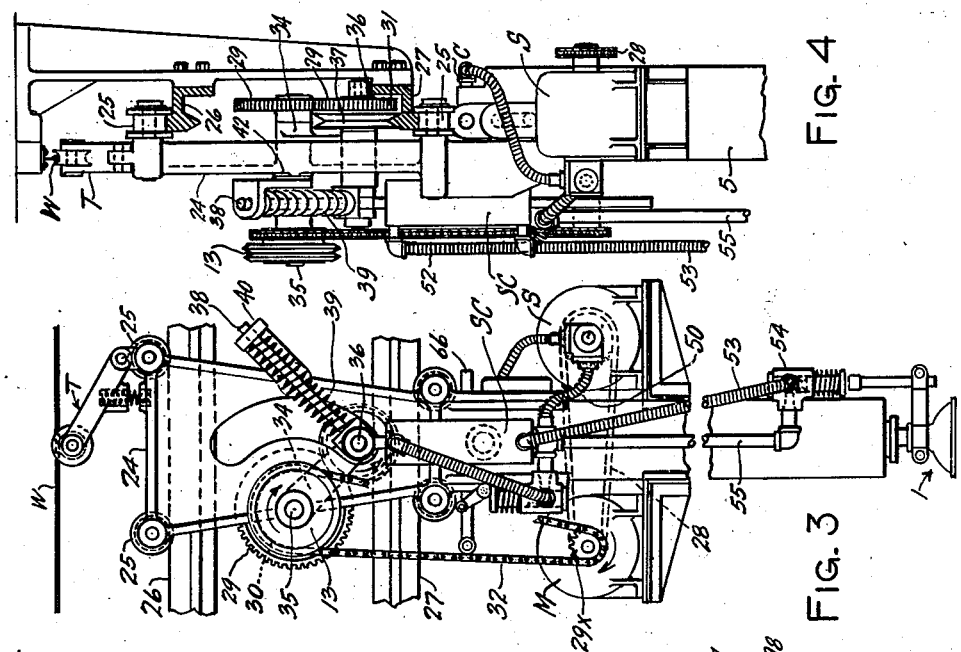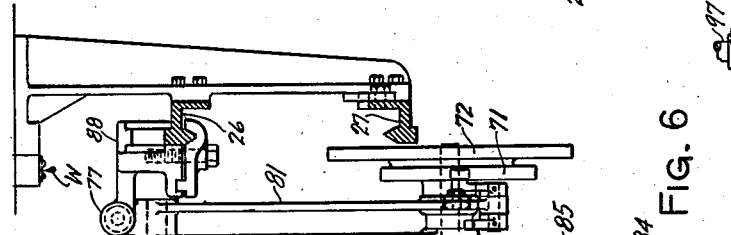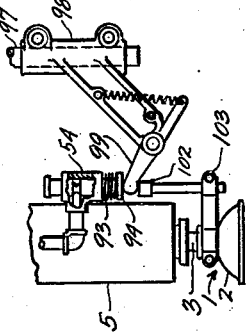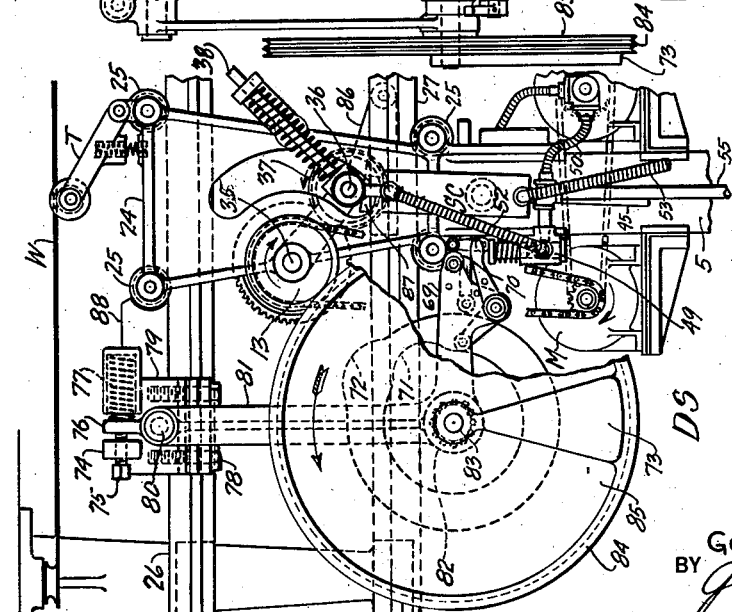

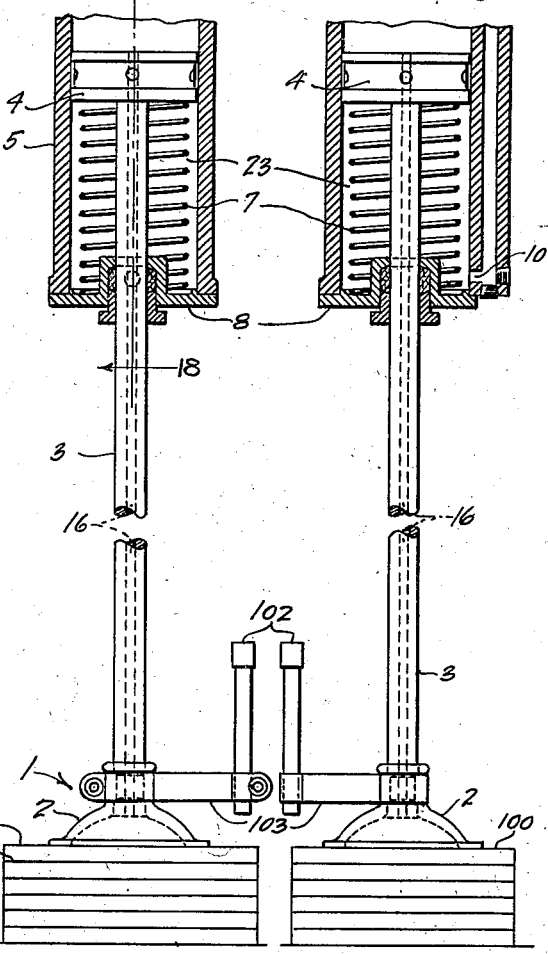

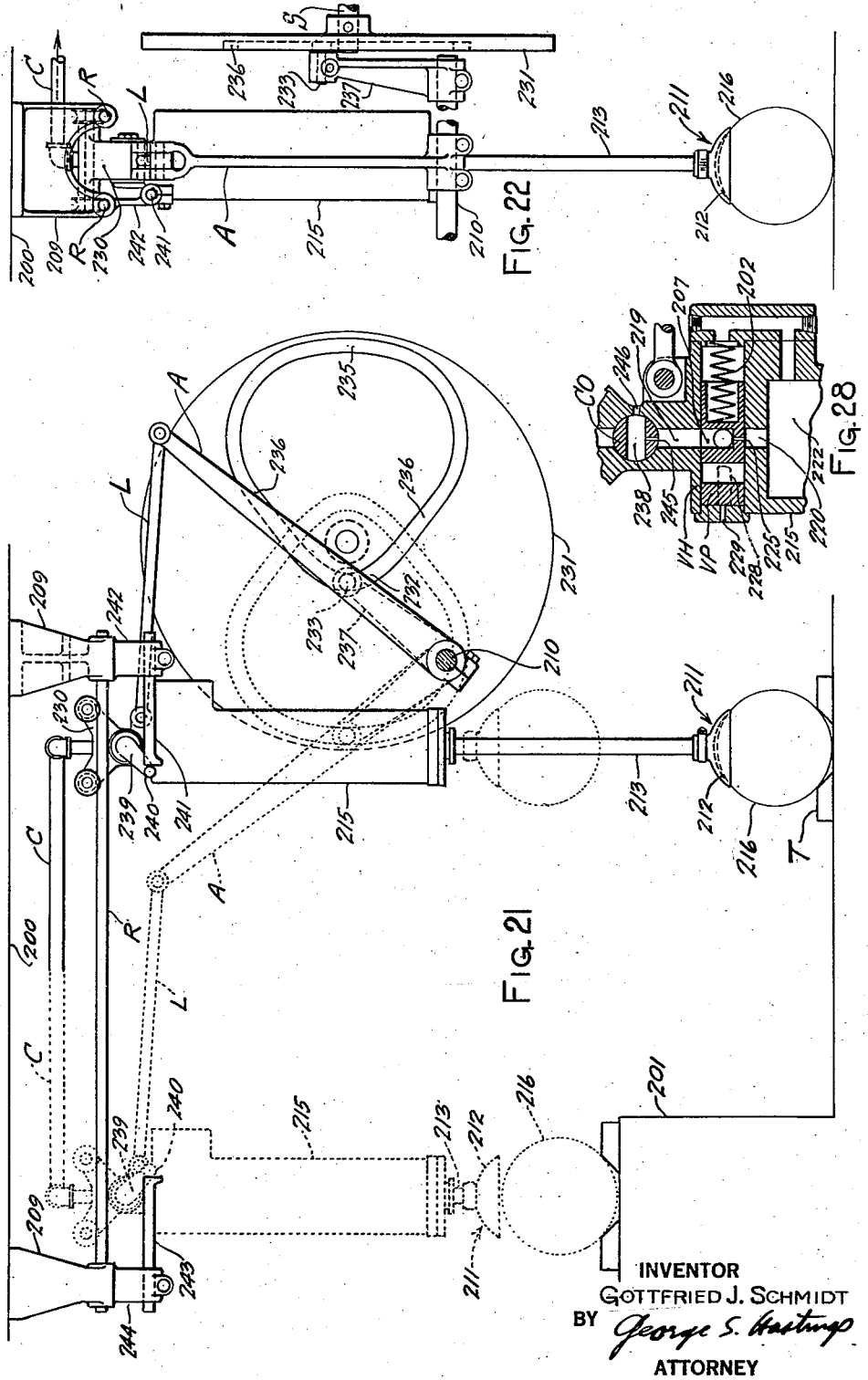

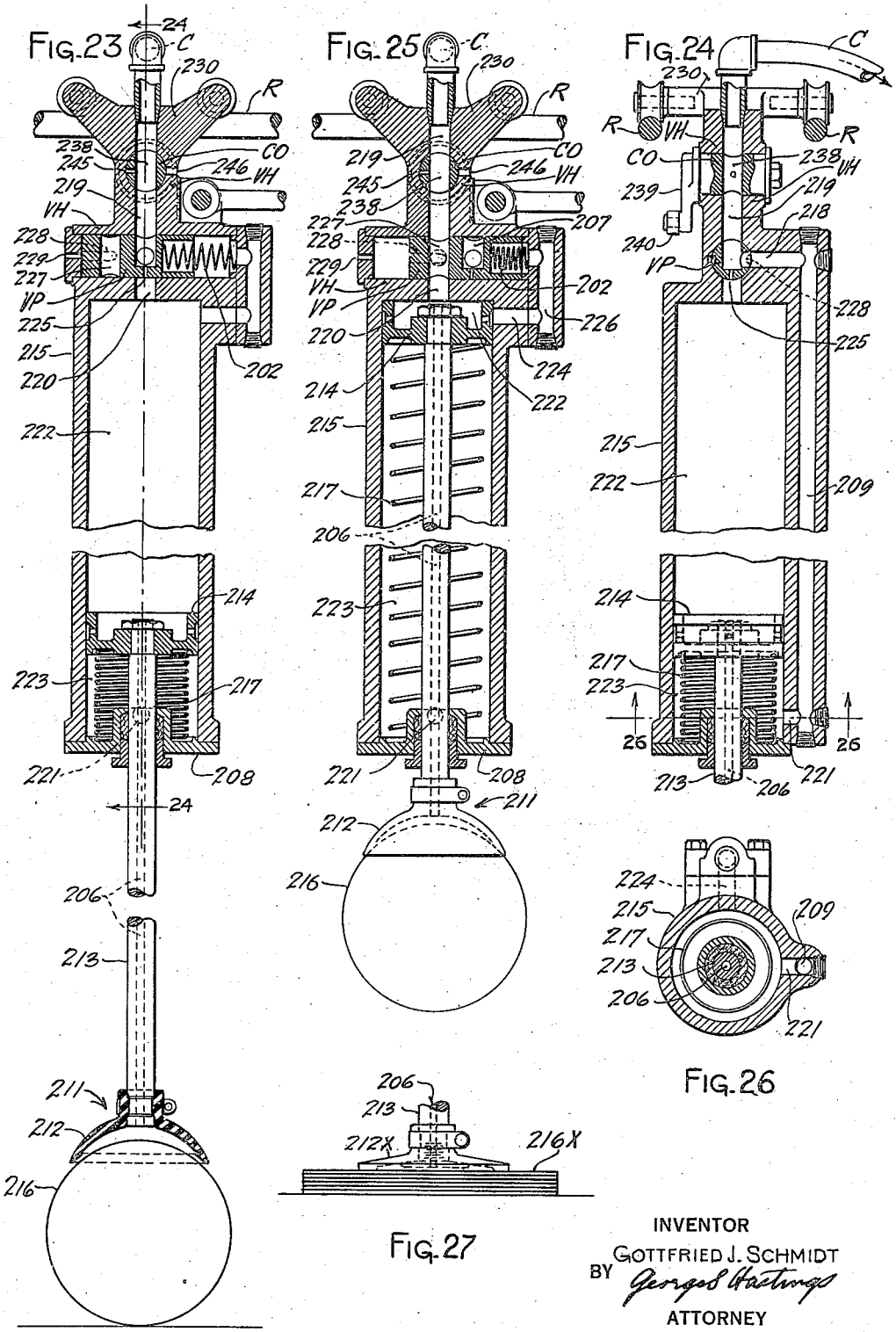

Patented July 1, 1941

2,247,787

UNITED STATES PATENT OFFICE 2,247,787

SUCTION LIFTER

Gottfried J. Schmidt, Pearl River, N. Y., assignor to Bowling Patents Management Corporation, a corporation of New York Application July 29, 1939, Serial No. 287,225

19 Claims. (Cl. 214—1)

This invention relates to a transfer mechanism of the class comprising a suction head provided with a vacuum cup adapted to be engaged operatively with an article to be transferred, and movable with said article from station to station in a cyclical path, the invention having for its general object the provision of mechanism for accomplishing automatically all operations requisite to the transfer of one or more articles from a pick-up station to a deposit station, the events of the transfer cycle being performed recurrently through an indefinite series of such transfers without manual intervention.

Among numerous objects ancillary to the above general object, is the provision of a fluid pressure cylinder provided with a piston having connections to and adapted to actuate the suction head, said cylinder and suction head being fabricated with suitable ports and ducts in communication with a suitable source of suction and with the atmosphere whereby differentials of pressure may be set up at opposite sides of the piston in the cylinder, in order to reciprocate the suction head in performance of the various events of the machine cycle.

A further object is to provide a novel means for controlling the relative pressures as between the various ducts in such a manner that the physical contacts between the article to be transferred and an appropriate part of the suction head, such as the vacuum cup, will set in train the series of operations to which reference has been made above, making effective in the first place, a fluid pressure head below the piston adequate to lift the piston and suction head, with an engaged article sustained exclusively by the vacuum sealed joint between the article and the vacuum cup, while the transfer from the pick-up station is accomplished.

An object of prime importance is to provide a novel form of fluid pressure control circuit including a fluid pressure responsive valve device constructed and arranged to admit air under atmospheric pressure below the piston, and place the space above the piston in communication with the source of suction when the vacuum sealed joint is completed between the vacuum cup and the article to be transferred, the valve motion for this purpose being effected by setting up a slight increase in the suctional effect ahead of the aforesaid valve, which will be hereinafter designated the pneumatic automatic control valve, for the sake of brevity.

Another object of the invention is to provide means by which lateral movement of the suction head and its load will be caused at a desired height, by the provision of a crane by which the fluid pressure cylinder and the suction head are transferred, the crane running upon a suitable track.

As a cognate object, provision is made of a motor, which may be mounted on the crane and has gearing adapted to actuate an adjustable driving wheel which may be swung into engagement with an upper rail, and alternatively with a lower rail of the track structure, thereby to move the crane, cylinder and load bodily between the stations in either direction as required by the several events of the machine cycle.

In pursuance of the general object of the invention, it is a further object to bring the operations of this crane and its motor and gear shift under the control of a pneumatic control circuit or circuits, with valve devices operated by relative movements between the operating parts of the crane, cylinder, load and track structure.

It is a further object to actuate the motor from a suitable source of power, which may be electric, pneumatic or of other suitable character, according to the exigencies of particular installations. If an electric motor be used it may also actuate a pump to activate the fluid pressure vacuum system.

Other objects and features of the invention will appear as the description of the particular physical embodiment selected to illustrate the invention progresses.

In the accompanying drawings, like reference characters are applied to corresponding parts throughout the views which make up the drawings in which:

Figure 1 is a view in front elevation of part of a transfer system in the construction of which the present invention has been embodied, this view illustrating a fluid pressure cylinder carried by a crane running upon an overhead track; also a suction head operated by the cylinder, and valve mechanisms associated therewith, the parts being shown at the pick-up position;

Figure 1a is a fragmentary detail view in side elevation showing the suction head in position to trip a valve;

Figure 2 is a view in end elevation looking from right to left on Fig. 1;

Figure 3 is a view similar to Fig. 1 of the crane and its associated parts shown in an intermediate operative transfer position;

Figure 4 is a fragmentary detail view in vertical sectional elevation of the parts as shown in Fig. 3;

Figure 5 is a view similar to Fig. 1, but showing the parts at the depositing position, associated with cam mechanism designed to effect the various phases of the operation of depositing the article after transfer;

Figure 6 is a vertical sectional elevation of the parts shown in Fig. 5;

Figure 7 is a view similar to Fig. 5, but illustrating certain parts of the pneumatic gear shifting control circuit in vertical section, and showing the shifting gear in position to move the crane and its suspended fluid pressure cylinder, suction head and load (not shown) from the deposit station to the pick-up station;

Figure 8 is a fragmentary detail view in horizontal section, taken on the line 8—8 of Fig. 7, parts being omitted for the sake of clearness in illustration;

Figure 9 is a similar fragmentary detail view in horizontal section, taken on the line 9—9 of Fig. 7;

Figures 10 and 11 are respective fragmentary detail views in veritcal section of the fluid pressure cylinder head, illustrating different operative positions of the pneumatic automatic control valve;

Figure 12 is a similar view taken on the line 12—12 of Fig. 10;

Figure 13 is a fragmentary detail view similar to Fig. 10, illustrating the fluid pressure cylinder head and its associated parts, including a modified setting of the valve operating cam;

Figure 14 is a horizontal sectional view on the line 14—14 of Fig. 13;

Figure 15 is a fragmentary detail view on an enlarged scale of the stop and detent mechanism for the pick-up station;

Figure 16 is a view in vertical section of the parts shown in Fig. 15 taken on the line 16—16 of Fig. 15;

Figure 17 is a sectional elevation of the main or lift cylinder and its valve head, showing the setting of the valves when delivering the load at the deposit station;

Figure 18 is a sectional elevation taken on the line 18—18 of Figure 17;

Figure 19 is a sectional elevation similar to Fig. 17, showing the setting of the valves when lifting the load away from the pick-up station;

Figure 20 is a fragmentary detail view of the suction head when about to be engaged with the load, preliminary to picking up the load;

Figure 21 is a schematic view in side elevation of a transfer system embodying the present invention in a modified form;

Figure 22 is a view in end elevation of the parts shown in Fig. 21;

Figures 23 and 25 are views on an enlarged scale in sectional elevation of the suction head, in conjunction with the load and showing in vertical section the modified fluid pressure operating cylinder and the pneumatic-automatic control valve therefor, all mounted upon a suitable carriage adapted to roll upon the tracks illustrated, these figures illustrating the operating parts as the are positioned at the pick-up position and at a transfer position, respectively;

Figure 24 is a fragmentary detail view in vertical section taken on the line 24—24 of Fig. 23;

Figure 26 is a view in horizontal section taken on the line 26—26 of Fig. 24; and Figure 27 is a fragmentary detail view in elevation of a suction head in operative connection with a stack of metal sheets, each of which constitutes the load when lifted.

In a now preferred embodiment of the invention selected for illustration and description, and referring first to the structure illustrated in Figs. 1 to 20, inclusive, the part designated generally by the reference character I is the suction head of a transfer mechanism in the construction of which the present mechanism has been embodied, comprising a vacuum cup 2 mounted upon a plunger 3 which is constituted by the piston rod of a piston 4 (see Fig. 17), in a fluid pressure cylinder 5, by which the suction head I and its load B (a 16-pound bowling ball in the instance illustrated—see Fig. 20) are lifted and/or sustained, transferred and deposited.

A spring 7 is provided to bias the piston 4 upwardly, counterbalancing the weight of the plunger and its associated moving parts wholly or in part, and ducts 9 and 11 connect the chambers 22 and 23, above and below the piston, through ports 10 and 20, the duct 15 being in communication with a source of suction S (see Figs. 2 and 18) through a suitable conduit C.

The fluid pressure cylinder together with the suction head and their associated parts, to be described more at length, are mounted upon a crane 24 having wheels 25 running upon tracks 26 and 27 between several stations of the transfer system, which stations will be designated generally by the reference characters PU, indicating the pick-up station, and DS, indicating the deposit station.

In addition to the fluid pressure cylinder with its suction head, the carriage is preferably provided with an electric motor M and the vacuum and compression pump S, which is driven by the motor through suitable means, such as the sprocket chain 28, (Fig. 1), and the carriage is further provided with a set of gearing 29, 30 and 31, of which 30 is a sprocket wheel driven by a sprocket chain 32 running from a sprocket wheel 29x on the shaft 33 of motor M. The gear 31 is a shift gear mounted upon an arm 34 which is fulcrumed upon the shaft 35 carrying the gear 30, the shaft being journalled in bearings carried by the crane 24. The gear 31 is fast on a shaft 36 which carries also a grooved friction actuating wheel 37 and this wheel, as shown clearly in Fig. 4, is adapted to enter into operative engagement with the lower track 27 when in the position illustrated in Figs. 3, 4 and 5, and alternatively can be moved to the position shown in Fig. 7 where it is engaged with the upper rail 26.

Means are preferably provided to bias the arm 34 and wheel 37 yieldingly toward each of the above described contacts with the rails 26 and 27, respectively, which preferred means for applying such bias takes the form of a rod 38 upon which is mounted a spring 39 under compression between a swivel 47 carrying shaft 36, and an abutment 40 mounted on a swinging bracket 41 which can be oscillated around a pivot stud 42 mounted on the crane 24. When the wheel 37 is engaged with rail 27 and is rotated by motor M, the friction wheel 37 will be rotated counterclockwise and run along the track 27 from right to left, and will move the crane and all its associated parts in that direction, which in the instance illustrated is toward the deposit station DS. When the gear 31 is in its uppermost position, as shown in Fig. 7, the friction driving wheel 37 will be engaged with the rail 26, and as the wheel is always turned counterclockwise, it will run from left to right along said upper rail 26 and will cause movement of the crane and its associated parts in that direction, i. e., toward the pick-up station PU.

Any suitable means may be provided to effect the changes in the position of the arm 34, its shaft 36 and the gear and friction wheel carried by said shaft. The best constructions now known to applicant for this purpose include a shifting cylinder, designated by the reference character SC, which is clearly seen in Fig. 7, the same being mounted upon the crane 24 somewhat above the main fluid pressure cylinder and has a piston 44 mounted upon a rod or plunger 45 which extends at 46 from the cylinder SC and is connected to the pivot bearing 47 upon the shaft 36.

Movements of the piston 44 are accomplished under control of a valve 48 in a valve casing 49 to which leads a duct 50 in communication with the low pressure side 51 of the compressor-vacuum pump S. A flexible hose 52 (see Fig. 5) leads from the valve casing 49 to the space above the piston 44 in cylinder SC so that when the valve is in the position shown in Fig. 7, suction will be applied above the piston 44 and the latter will rise, forcing the rod 46 upward to move shaft 36, gear 31 and friction driving wheel 37 into the upper position shown in Fig. 7 where it is engaged with rail 26.

It will be observed that in pursuance of the invention, the arm 34 and rod 33 form cooperating parts of a toggle joint of which the knuckle is constituted between shaft 36 and its associated connections, the result being that as soon as the plunger 46 has raised the shaft 36 beyond the center line connecting the shaft 35 with the pivot 42, the bias of spring 39 will become effective to throw the shaft 36 to its extreme upper position, shown in Fig. 7 or, upon reversal of the action, to its extreme lower position as shown in Fig. 3.

Movement of the plunger 45—46 is caused by drawing the piston 44 downward through the space at the bottom of the cylinder by the action of suction, which is applied through another flexible hose 53, which extends upward from a valve casing 54 (see Fig. 3) deriving its suction through a duct 55 connected with the low pressure side of the compressor and vacuum pump S.

In pursuance of the invention, movements of the crane, etc., in its path along the rails 26—27 are controlled by mechanism at the ends or other appropriate portions of said path, and in the instance illustrated, such mechanism is provided at the pick-up station PU and somewhat different mechanism at the deposit station DS.

Describing these operations in the natural order of the events, the pick-up operation is best understood by reference to Fig. 1, which is an assembly view showing all of the parts requisite for that operation, in their position at the pick-up station designated PU where the crane 24 is shown, with its depending fluid pressure cylinder 5, suction head 1, and their associated parts, such as the pump S, shifting cylinder SC and motor M, all mounted upon the crane, which is energized by electrical current brought in through an overhead trolley T running on an overhead wire W in known manner.

Referring to the crane 24 and all of the parts movable laterally therewith as the crane, for the sake of brevity, Fig. 1 shows this crane where it stops at the end of a cycle of events, at which position the suction head 1 remains elevated, as shown in full lines in Fig. 1, without a load, but ready to descend to the position best indicated in Fig. 20, in which the vacuum cup 2 is about to be engaged with the ball B while the pneumatic automatic valve PV occupies the position shown in Figs. 10 and 12, in communication with the low-pressure side of pump S through conduit C and duct 15 (Figs. 1 and 18) and also being in communication with the chamber 23 of cylinder 5 through ducts 9 and 11 and valve ports 10 and 8 (Fig. 18), drawing the piston 4 downwardly by the suction thereon applied in chamber 23 until the vacuum cup 2 and load are in contact (see Figs. 17 and 18), forming a vacuum sealed joint in known fashion, the suction for energizing the vacuum cup at this stage being made effective through the duct 16, lengthwise of plunger 3, and the chamber 22 of cylinder 5, port 20 of the cylinder head, and a small opening 21 in the bottom of pneumatic valve PV (see Figs. 10–14, 17–19, inclusive).

When the system is in operation, there is always a slight "bleed" through this little port 21, when free of the load and this bleed is of an order sufficient to seal the vacuum cup to the load, upon contact, as for example the ball B or the upper sheet 100 of a stack of sheets, such as tin sheets 101, as shown in Figs. 17 and 18.

Immediately upon such sealing, however, the suction through port 21 and port 12 in the valve PV through duct 15 into the chamber 22, and through duct 6, having no other avenue of relief, pulls over the valve PV, against the bias of compression spring 14, into the position shown Fig. 19, whereupon suction is made effective, in chamber 22, of an order adequate to lift the piston 4, plunger 3 and load B, all of the way up to the position shown in Fig. 1a.

On its way from the intermediate position shown in Fig. 1 to that shown in Fig. 1a, the post 102, mounted adjustably in a bracket 103 clamped upon plunger 3, is engaged with a distance piece 99 pivoted upon a bracket 98 clamped in adjusted position upon a hanger 97 depending from a boss 96 upon a bracket 95 clamped to rail 27 in horizontal adjusted position, and when so engaged and moved upward the piece 99 presses up a valve-actuating push button 94 which is normally biased by spring 93 to the extended position shown in Fig. 1.

This movement upward of push button 94 to the position shown in Fig. 1a, opens the valve in valve casing 54 to make the suction of pump S effective below the piston 44 in the shifting cylinder SC, (Fig. 7), and the piston descends, drawing rod 46 and shaft 36 downward to bring friction wheel 37 into engagement with the track 27, and as the said wheel 37 is always running, the crane is moved laterally to the left from the pick-up station PU, it being understood that by its descent the shaft 36 has been cleared from the restraining influence of the detent 92 (Fig. 15) which normally has dropped behind the shaft 36 as soon as the wheel 25 has been stopped by the bumper 91 on its right-hand travel. The bumper 91 is adjustable and has a cushion 90, and the track 26 is provided with a cam device 89 which may be secured at a suitable point to depress shaft 36, moving wheel 37 out of engagement with the overhead track 26, upon arrival at the pick-up station.

At any stage of its transfer movement laterally, the crane and its associated parts present the appearance illustrated in Figs. 3 and 4, and the pneumatic-automatic valve PV occupies the position shown in Fig. 19.

The next event in the transfer cycle occurs when the crane reaches the deposit station DS (see Fig. 5) where further motion laterally is arrested by a bumper 88 (see Figs. 5 and 7) like the bumper 91 already described, associated with the rail 26. Just before this arrest, the shaft 36 runs upon the incline 86 of a detent like the incline and detent 89—92 already described throwing the wheel 37 off the track 27, and incapacitating the crane from movement laterally at the deposit station. The detent 86 serves to hold the crane at the deposit station, operating in a manner similar to that of the parts 89 and 92 in Fig. 15.

The next event consists in the engagement by grooved friction wheel 13 (Fig. 5), with a control wheel 85 having a rim 84 formed with an inverted V-shaped contour in cross-section, which is so formed as to give a good frictional contact with the reverse V-shape on wheel 13.

The wheel 85 is mounted rotatably upon a shaft 83 journalled in bearings 82 at the free end of a bracket 81 depending from a pivot 80 carried by a split clamp 79 secured adjustably upon the rail 26 as by volts 78. A spring 77 exerts a bias upon an arm 76 of the bracket 81 relatively to rail 26, and thus acts to determine the position of the control wheel 85 relatively to the friction wheel 30, operating in a manner which will be understood readily by those skilled in the art.

The wheel 85 has a counterweight 73 which tends to gravity-bias the wheel to the position shown in Fig. 5, wherein the two disc cams 72 and 71, fixed on, and rotatable with the shaft 83 are shown as occupying, respectively the dotted line positions illustrated in Fig. 5, the cam 72 being somewhat in the lead, with reference to rotation of the wheel which is normally counterclockwise when turned by friction wheel 13. Both cams are timed, as illustrated, to rotate through nearly a complete turn before becoming effective for their intended purposes, as will be clear upon reference to Fig. 7.

This lag of the cams is designed to afford time for the plunger 3 to descend from the elevated carrying position shown in Fig. 3, to the deposit position shown in Figs. 17 and 18, an event which supervenes immediately upon arrival of the crane at its Fig. 7 position, where an adjustable eccentric cam 70, mounted upon an arm 69 of the bracket 81, or upon any suitable relatively stationary part of the frame, and set in the path of a suitable lever 68 (see Fig. 10) pivotally mounted on the cylinder head VH, pulls the valve PV to its Fig. 10 position and makes the suction effective in the lower chamber 23 to pull down the piston 4, suction head 1 and load against the action of spring 7, (Fig. 18).

The lowering action can be controlled by a suitable setting of the eccentric stop 70 as indicated in Figs. 10 and 13, to regulate the flow of fluid from the chamber 23 by setting the valve PV in positions which range from the full-open position of Fig. 10, to a cut-off position, which may be greater or less than that illustrated in Figs. 13 and 14. When valve PV is set as in Fig. 10, the piston and load will be drawn down more rapidly than when the valve is set in the position of Figs. 13 and 14, the suctional effect being less in the last-named position of the valve.

In order to diminish the suctional effect still further, the invention provides for a bleed from the outer air, which is made effective in the space 22 through a channel 18 in the periphery of valve PV, this channel serving to place the space 23 in communication with the outer air through a path traced through duct 11 and 9 and port 10 (Fig. 18). The higher pressure thus admitted tends to check the descent of the load and can be regulated at will by adjusting the eccentric stop 70.

The parts being in the position shown in Figs. 17 and 18, with the valve PV in position to make suction effective in space 23, the piston 4 and suction head 1, with load B or 100 as the case may be, descend to deposit the load, and then atmospheric pressure is made effective in cylinder space 22 through bleed channel 18, orifice 21 and port 20, to create therein a plenum of air which is in communication with the interior of vacuum cup 2 by way of the duct 16 and acts to loosen the cup 2 and deposit the load in the desired spot, as indicated in Figs. 17 and 18.

During the deposit event, the control wheel has been turned by action of the friction wheel 13 until the cam 72 has been engaged with the valve operator stem 67, as shown in Fig. 11, operating the cut-off valve CO to shut off the suction from space 23, whereupon the spring-bias of spring 7 is made effective to raise the load-free suction head to a position clear for the return transfer of the crane and its associated parts to the pick-up station PU.

The return is initiated very shortly after said elevation of the suction head, by action of the cam 71 which, as shown in Fig. 7, follows closely after cam 72 and trips a bell crank lever 65 into engagement with push button 64 on valve 48, thereby making suction effective in the upper space of shift cylinder SC, forcing up the piston 44, rod 46, shaft 36 and friction wheel 37, into the position where the last-named wheel runs upon the track 26, as shown in Fig. 7, and the crane travels in its right-hand direction, carrying the empty, elevated suction head along until the horizontal valve stem 66 is engaged with a stop 66x (see Fig. 1) which may conveniently be mounted adjustably in a sleeve 63 carried by the same bracket 96 which is clamped as at 95 upon the bottom rail 27 and supports the upright 97, bracket 98 and spacing member 99 to which reference has already been made.

As can be readily seen, the spacer 99 occupies normally a level position where it is cleared by the push button 94 and the post 102 as they accompany the crane in its right-hand travel. The bias of spring 7 is designed to bring the suction head normally to the height shown by full lines in Figs. 1 and 19, with the post 102 at the proper position for clearance of the spacer 99, the latter being thus disposed correctly to cooperate with the post 102 and push button 94, as shown in Fig. 1a, after descent of the suction head and subsequent elevation of the same with a new load, at the initiation of a new transfer cycle.

Fig. 19 shows the position of the working parts of the lift cylinder 5 at this stage, with the pneumatic valve PV at its extreme right-hand position, having its channel 19 set to make the suction from C effective in space 22.

In a modified embodiment of the invention illustrated in Figs. 21 to 28, inclusive, a transfer system is illustrated in which is embodied the basic idea of means underlying the invention, the same being characterized by mechanism designed to operate in a cyclical path, the events constituted by the several operations being accomplished recurrently without manual intervention.

In the modified embodiment selected for illustration of this form of the invention, rails R are supported by brackets 209 depending from a suitable overhead structure 200, such as a beam in the ceiling or other structural part of a room in a building, as for example in a bowling alley, where T is a typical trap for a spent ball, such as a bowling ball 216, while 201 shows the starting ramp of a return runway, near the pit, in a bowling alley, and upon which it is customary to deposit a ball, such as that illustrated at 216, ready to run back to the other end of the alley for use by the player.

In pursuance of the invention, provision is made for transferring the ball from the trap T to the ramp 201 by means of a vertically reciprocating suction head 211 which may desirably take the form illustrated in Figs. 23-28, inclusive.

In the instance illustrated, it comprises a vacuum cup 212 attached to a plunger 213 constituted by the piston rod of a fluid pressure cylinder 215 which is in communication with a suitable source of fluid power (not shown) through a flexible conduit C.

The gravity bias downward of the suction head 211, its plunger 213 and the piston 214 (see Figs. 23-25), is counteracted in part at least by the action of a coiled spring 217 under compression between the piston 214 and the lower end 208 of the cylinder 215, and preferably the spring will avail to raise the suction head and its associated parts when no load is carried to a height somewhat below the position in Fig. 25.

Positive actuation of the piston 214 is accomplished, to raise and lower the load, by making effective a suitable differential of pressure in the spaces 222 and 223 above and below the piston, and this is achieved under control by a pneumatic automatic valve VP, shown as a slide valve in the instance illustrated, and adapted to be reciprocated in a valve head VH.

When the valve VP occupies the position shown in Figs. 23 and 24, to which it is normally biased by a coil spring 202, suction will be made effective in the lower space 223, and the piston 214 and suction head 211 are thereby drawn down against the yielding resistance of the spring 217 until the vacuum cup 212 is brought firmly into engagement with the upper surface of the load 216, which may, of course, be of any suitable character, in this instance being shown merely by way of illustration as a bowling ball 216.

In Fig. 27 the load is shown as one of the plates or sheets 216x in a stack of tinned sheets such as those used in making cans, and an appropriate vacuum cup 212x is provided which corresponds in essential respects to the vacuum cup 212 in the other figures.

During the period of descent, there is a relatively small vacuum in the upper space 222 due to the fact that while that space is in communication with the vacuum source C through the channel 219 and a small aperture 225 in the valve PV, and through the port 220, the suctional effect is neutralized by a bleed through a duct 206 extending to the interior of vacuum cup 212 through the plunger 213. Immediately upon completion of the vacuum tight seal between cup 212 and the load 216, created by engagement of their mutually contiguous surfaces upon completion of the downward movement of suction head 211, the bleed is discontinued, and sufficient suction becomes effective in the chamber 222 and ducts 224, 226 in the cylinder head, to counteract the bias of coil spring 202 and draw the valve VP over to the position shown in Fig. 25, thus bringing the valve channel 227 into direct communication between the duct 219 leading from source C, and the space 222, through port 220.

Thus the entire suctional effect is now applied to piston 214 and combines with the bias of spring 217 to raise the load to the position shown in Fig. 25, this event occurring in an exclusively automatic fashion, without manual intervention. During its occurrence, the vacuum in space 223 is relieved by opening it to the access of atmospheric pressure by a path traced through the port 221, ducts 209 and 218 (Fig. 24), a channel 228 (see dotted lines in Figs. 23-25) in the periphery of valve VP, and a bleed 229 from the outer air. This arrangement adds the atmospheric pressure to the lifting effect in pursuance of the invention.

The load is held by the suction head 211 in its elevated position (Fig. 25) as long as suction through duct 219 continues, and during this elevation the next event occurs in the transfer cycle, viz., the lateral movement of the carriage 230 along the rails R.

The present embodiment of the invention is designed to effect automatic recurrent movement of the carriage to and fro in a known path which comprises approximately the distance between brackets 209, in the instance illustrated. Any suitable means may be provided to carry out the movements laterally of the carriage requisite to performance of the events which make up the complete cycle of such a transfer mechanism, and as a convenient form of means for the intended purpose, a link motion mechanism comprising an arm A and a link L is shown, actuated by rotation of a cam 231, having in its face a groove 232 entered by a stud 233, suitable means, such as a shaft s with connections (not shown) to a prime mover, being provided to effect said rotation of the cam and consequent oscillations of the arm A around the axis of a rock shaft 210 carried by a part of the machine (not shown).

The arm A has connections constituted by the link L, such that a dwell occurs in movement of the suction head, when at the station 201 and the head is depressed during said dwell in lateral movement of the carriage and its load, controlled by the concentric shape of the portions 232 and 235 of the cam groove.

The actual transfer movement of the carriage, etc., is accomplished rather quickly as the somewhat acutely angular portions 236 of the cam are respectively brought into play to move the parts (see Figs. 21 and 22) by thrusting the link L toward the left-hand or discharge station 201 in Fig. 21. The cam follower stud 233 is mounted on a crank 237 fixed on the rock shaft 210.

A cut off valve CO is provided (see Figs. 23-28), having a channel 238 through which suction is made effective when the valve CO occupies its open position shown in Figs. 23-25, and the valve is moved to this position by engagement of a roll 240 (see Figs. 21 and 24) on a crank 239, with an adjustable stop 241 mounted in a bracket 242 depending from the bracket 209 above the pick-up station over the trap T.

When suction is thus made effective, the valve VP occupies the position shown in Fig. 24 and draft downward on the piston 214 is applied through the channel 238, ducts 219, 218, 209 and port 221 as already described, to bring the vacuum cup 212 down into sealed engagement with the load, as in Figs. 21-25, then acting to move valve VP, and to raise the load to its elevated position as shown in Fig. 25, the suction continuing to sustain the load during transfer thereof to the position shown in dotted lines in Fig. 21, when the roller 240 of crank 239 is brought into engagement, as shown, with a similar stop 243, reversely mounted in bracket 244, turning the valve CO to its position in which the suction is cut off, as shown in Fig. 28.

Thereupon, the bias of spring 202 is made effective to shift valve VP into its left-hand position, as shown in Fig. 23 (it being understood, however, that cut-off valve CO is as yet still closed as shown in Fig. 28, and the absence of suctional effect permits the gravity bias of the combined weight of the load 216 and the suction head 211 and piston 214 to cause descent of the load to the ramp 201.

Upon arrest of the load at deposit station 201, the vacuum cup will remain in engagement with the load momentarily, while an inward bleed of atmospheric pressure through orifice 246 in the valve head (Fig. 28) channel 238 of the cut-off valve CO, bleed orifice 245 to channel 219 and thence through channel 207 of valve VP, bleed 225 and port 220 to chamber 222 and duct 206 to the vacuum cup 212 (Fig. 23) results in breaking the vacuum seal between cup 212 and load 216.

Thereupon fluid pressures are substantially equalized in spaces 222 and 223 and the spring 217 raises the load-free suction head 211 and piston 214 to an elevated position approximately that shown in dotted lines in Fig. 21, clear of the load, and ready to be transferred by the arm-link mechanism A—L as the wall of either cam groove portion 236 acts to retract the carriage 230 toward the pick-up station and into engagement anew by stop 241 with roller 240 of the crank 239 of cut-off valve CO, which turns the latter to its open position of Figs. 23-25, making suction effective to lower the suction head and start the cycle all over.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. A transfer mechanism of the class comprising a suction head with a vacuum cup device adapted to be engaged with an article to be transferred, means to move said vacuum cup toward and away from a position occupied by said article, means to apply to said vacuum cup suction of an order adequate to form a substantially vacuum-tight sealed joint between said cup and said article, a suction control valve means, and means to operate said valve to make effective in said vacuum cup suction of a higher order adequate to sustain the article.

2. A transfer mechanism having the features claimed in claim 1, wherein said means to supply suction to said vacuum cup includes connections from a source of suction adapted to supply a suctional effect capable of being modified to produce various effective orders of suction pressure, and said valve means comprises a pneumatic automatic valve included in a pneumatic control circuit with said vacuum cup and responsive to changes in pressure in said circuit initiated by completion of said vacuum sealed joint between the suction head and said article.

3. A transfer mechanism having the features claimed in claim 1, wherein said means to supply suction to said vacuum cup includes connections from a source of suction adapted to supply a suctional effect capable of being modified to produce various effective orders of suction pressure, and said valve means comprises a pneumatic automatic valve included in a pneumatic control circuit with said vacuum cup and responsive to changes in pressure in said circuit initiated by completion of said vacuum sealed joint between the suction head and said article, and mechanism to move said suction head and its associated parts in a cyclical path, said valve being constructed and arranged to make said suction automatically effective to lift said suction head and article bodily preliminary to said bodily movement of the suction head in said cyclical path.

4. A transfer mechanism of the class comprising a suction head with a vacuum cup suction device adapted to be engaged removably with an article to be transferred, means to cause operative engagement of said device with said article, means to apply to said vacuum cup suction of an order adequate to form a substantially vacuum-tight sealed joint, and means to make said suction effective in said cup thereafter to an extent adequate to sustain said article, and means to move said suction head bodily through at least part of a cyclical path with an article sustained thereby.

5. A transfer mechanism having the features claimed in claim 4, wherein said means to cause operative engagement of said device with said articles includes a fluid pressure cylinder having a piston with connections to, and adapted to reciprocate, said suction head, and means to support said cylinder for movement with the head in said cyclical path.

6. A transfer mechanism having the features claimed in claim 4, wherein said means to cause operative engagement of said device with said articles includes a fluid pressure cylinder having a piston with connections to, and adapted to reciprocate, said suction head, and means to support said cylinder for movement with the head in said cyclical path, said supporting means including a crane, and a track on which said crane runs.

7. A transfer mechanism having the features claimed in claim 4, wherein said means to cause operative engagement of said device with said articles includes a fluid pressure cylinder having a piston with connections to, and adapted to reciprocate, said suction head, and means to support said cylinder for movement with the head in said cyclical path, said supporting means including a crane, and a track on which said crane runs, a motor and a pump mounted on said crane, a trolley also carried thereby, an exterior conductor adapted to be engaged movably by a current collector on said trolley, electrical connections by which said current is made effective to energize said motor, and mechanical connections whereby said motor propels said crane and actuates said pump to operate said suction head and pneumatic control mechanism.

8. A transfer mechanism of the class comprising a suction head adapted to be engaged with an article to be transferred, a fluid pressure cylinder adapted to lift and lower said suction head to engage, lift and transfer said article, and a pneumatic automatic valve movable with said fluid pressure cylinder, and included therewith in a pneumatic control circuit adapted to regulate the lifting and lowering movements of said suction head by said cylinder.

9. A transfer mechanism of the class comprising a suction head adapted to be engaged with an article to be transferred, a fluid pressure cylinder adapted to lift and lower said suction head to engage, lift and transfer said article, a pneumatic automatic valve movable with said fluid pressure cylinder, and included therewith in a pneumatic control circuit adapted to regulate the lifting and lowering movements of said suction head by said cylinder, and means to move said cylinder and suction head bodily through a cyclical path.

10. A transfer mechanism of the class comprising a suction head adapted to be engaged with an article to be transferred, a fluid pressure cylinder adapted to lift and lower said suction head to engage, lift and transfer said article, a pneumatic automatic valve movable with said fluid pressure cylinder, and included therewith in a pneumatic control circuit adapted to regulate the lifting and lowering movements of said suction head by said cylinder, means to move said cylinder and suction head bodily through a cyclical path, and means to actuate said valve to cause said suction head to pick up an article at one station in said path and to deposit the article at a remote station, said instrumentalities being constructed and arranged to accomplish said operations free from manual intervention.

11. A cylinder with a pneumatic automatic control valve having the features claimed in claim 9, wherein a reciprocating piston is provided, dividing said cylinder into upper and lower spaces, and said valve is interconnected between said spaces by ducts and ports, and is constructed and arranged to operate at times to establish a vacuum seal between the suction head and a load, and thereupon to transfer the suctional effect automatically to said upper space in the cylinder to lift and sustain the load.

12. In combination with a cylinder and a pneumatic automatic control valve, having the features claimed in claim 9, means to operate said valve to control pressures in said spaces of the cylinder to lower and raise the piston and load.

13. In combination with a cylinder and a pneumatic automatic control valve, having the features claimed in claim 9, means to operate said valve to control pressures in said spaces of the cylinder to lower and raise the piston and load, and to sustain said load in various positions.

14. A suction head in a transfer mechanism of the class described, having a vacuum cup adapted to be moved into engagement with articles to be lifted serially, a fluid pressure device to raise and lower said suction head with and without the load, and means acting to govern the lifting operation under control of said vacuum cup, whereby said vacuum cup is adapted to accommodate itself to engagement with articles of different dimensions, and each lifting operation supervenes only upon completion of a vacuum sealed joint between said cup and the load adequate to enable said cup to sustain the load.

15. In a transfer mechanism having a fluid pressure cylinder provided with a piston and spaces above and below said piston adapted to be connected through suitable ducts with a source of suction; and a pneumatic automatic valve mounted movably in a valve chamber associated structurally with said cylinder, and adapted to move in a pneumatic control circuit for regulating connections between said ducts and the cylinder spaces, said valve being movable to a position in which it shuts off suction from the space below said piston while maintaining above said piston adequate suction to hold the same at an elevated position; and a plunger, suction head and load sustained by said piston.

16. A cylinder with a pneumatic automatic control valve having the features claimed in claim 15 wherein said valve is adapted to cause the admission of atmospheric pressure in the space below said piston, thereby to aid in holding the load in an upper position.

17. Transfer mechanism comprising a suction head, a system of tracks having a plurality of rails, a carriage mounting said head and running on said track system, a fluid pressure cylinder to move said suction head for lifting and lowering a load, a motor and a geared wheel to move said cylinder along said track selectively, a shifting cylinder to shift said geared wheel into engagement first with one of said tracks and then from that track to another, to change the direction of travel of said carriage, and pneumatic control devices to regulate and control the operation of said cylinders.

18. In a transfer system of the class described comprising an overhead railway having a pair of spaced rails, a travelling crane thereon provided with a motor, a pump driven by said motor, running gear including relatively fixed and planetary frictional driving wheels powered by said motor, a gear shifting cylinder for placing said wheels in driving position, a fluid pressure lifting cylinder connected to said traveling crane, a piston positioned in said cylinder having a suction head operated thereby for lifting articles of different dimensions, and a pneumatic automatic valve for governing the lifting operation of the suction head.

19. In combination with a cylinder and a pneumatic automatic control valve, having the features claimed in claim 9, means to operate said valve to control pressures in said spaces of the cylinder to lower and raise the piston and load, and to pick-up said load in various positions.

GOTTFRIED J. SCHMIDT.

DISCLAIMER 2,247,787.—*Gottfried J. Schmidt*, Pearl River, N. Y. SUCTION LIFTER. Patent dated July 1, 1941. Disclaimer filed December 8, 1942, by the assignee, *Bowling Patents Management Corporation*.

Hereby enters this disclaimer to claims 14, 15 and 16 of said patent.

[*Official Gazette December 29, 1942.*]